US012795360B2

(12) United States Patent
Li et al.

(10) Patent No.: US 12,795,360 B2
(45) Date of Patent: Nov. 10, 2026

(54) CELLULAR SERVICE MANAGEMENT FOR SECONDARY MOBILE WIRELESS DEVICES

(71) Applicant: Apple Inc., Cupertino, CA (US)

(72) Inventors: Li Li, Los Altos, CA (US); Abishek Kumar Vaidyanathan, Union City, CA (US); Anish Kumar Goyal, Milpitas, CA (US); Keizo Marui, New Dundee (CA)

(73) Assignee: Apple Inc., Cupertino, CA (US)

( * ) Notice: Subject to any disclaimer, the term of this patent is extended or adjusted under 35 U.S.C. 154(b) by 293 days.

(21) Appl. No.: 18/776,701

(22) Filed: Jul. 18, 2024

(65) Prior Publication Data

US 2024/0373222 A1 Nov. 7, 2024

Related U.S. Application Data

(63) Continuation of application No. 18/341,458, filed on Jun. 26, 2023, now Pat. No. 12,047,775, which is a (Continued)

(51) Int. Cl.
*H04L 9/08* (2006.01)
*H04L 67/55* (2022.01)
(Continued)

(52) U.S. Cl.
CPC ............. *H04W 12/06* (2013.01); *H04L 67/55* (2022.05); *H04W 8/183* (2013.01); *H04W 12/08* (2013.01); *H04W 12/72* (2021.01)

(58) Field of Classification Search
CPC ....... H04W 8/183; H04W 12/06; H04W 4/50; H04W 12/72; H04W 8/24; H04W 8/18; H04W 12/50; H04W 8/20; H04W 8/245; H04W 4/60; H04W 12/08; H04W 12/42; H04W 88/02; H04W 88/18; H04W 24/02; H04W 36/0055; H04W 12/30;
(Continued)

(56) References Cited

U.S. PATENT DOCUMENTS

| | | | |
|---|---|---|---|
| 10,194,313 | B1 | 1/2019 | Karimli et al. |
| 2020/0050439 | A1 | 2/2020 | Bjørdal et al. |

(Continued)

FOREIGN PATENT DOCUMENTS

| | | | | |
|---|---|---|---|---|
| CN | 111263334 A | 6/2020 | | |
| WO | WO-2018160863 A1 * | 9/2018 | ........... | H04L 9/3263 |
| WO | 2020205011 A1 | 10/2020 | | |

OTHER PUBLICATIONS

Chinese Patent Application No. 202110675026.6—Notice of Allowance dated Mar. 6, 2024.

(Continued)

*Primary Examiner* — Gary Lafontant
(74) *Attorney, Agent, or Firm* — DICKINSON WRIGHT RLLP

(57) ABSTRACT

This Application sets forth techniques for cellular service management for a secondary mobile wireless device assisted by a primary mobile wireless device, including provisioning and management of electronic subscriber identity modules (eSIMs) for a secondary mobile wireless device with user authorization obtained via the primary mobile wireless device.

20 Claims, 10 Drawing Sheets

Related U.S. Application Data continuation of application No. 17/352,163, filed on Jun. 18, 2021, now Pat. No. 11,689,921.

(60) Provisional application No. 63/041,730, filed on Jun. 19, 2020.

(51) Int. Cl.

| | |
|---|---|
| ***H04W 8/18*** | (2009.01) |
| ***H04W 12/06*** | (2021.01) |
| ***H04W 12/08*** | (2021.01) |
| ***H04W 12/72*** | (2021.01) |

(58) Field of Classification Search

CPC ............... H04W 68/005; H04W 12/69; H04W 68/00; H04L 67/55; H04L 67/306; H04L 63/0869; H04L 67/303; H04L 9/40

See application file for complete search history.

(56) References Cited

U.S. PATENT DOCUMENTS

| | | | |
|---|---|---|---|
| 2020/0137558 | A1 | 4/2020 | Chaugule et al. |
| 2020/0178070 | A1 | 6/2020 | Yang et al. |
| 2021/0400479 | A1 | 12/2021 | Li et al. |
| 2023/0336990 | A1 | 10/2023 | Li et al. |

OTHER PUBLICATIONS

Sha Wenhao et al., “Development and Application of eUICC Technology”, Digital Communication World, No. 10, Oct. 1, 2018, 2 pages.

* cited by examiner

CELLULAR SERVICE SUBSCRIPTION ACCOUNT MANAGEMENT

600

| Configuration Type | Cellular Service Configuration | MNO Service Account Management Server URL Source |
|---|---|---|
| 1 | Primary And Secondary Mobile Wireless Devices Using Identical MNO | Use Manage Account URL From Primary Mobile Wireless Device (Get Sim Status Query) |
| 2 | Primary And Secondary Mobile Wireless Devices On Identical MNO Account And Cross Communication Supported | Use Most Recently Received Manage Account URL From Primary Or Secondary Mobile Wireless Device (Get Sim Status Query) |
| 3 | Primary And Secondary Mobile Wireless Devices On Distinct MNO Accounts And Cross Communication Supported | Use Manage Account URL From Secondary Mobile Wireless Device (Get Sim Status Query) |
| 4 | Primary And Secondary Mobile Wireless Devices On Different MNO Accounts And Cross Communication Not Supported | Use Address Update URL From Secondary Mobile Wireless Device (Get PSAS Query) |

*FIG. 6*

CELLULAR SERVICE MANAGEMENT FOR SECONDARY MOBILE WIRELESS DEVICES

CROSS-REFERENCE TO RELATED APPLICATIONS

The present application is a continuation of U.S. application Ser. No. 18/341,458, filed Jun. 26, 2023, entitled "CELLULAR SERVICE MANAGEMENT FOR SECONDARY MOBILE WIRELESS DEVICES," set to issue Jul. 23, 2024 as U.S. Pat. No. 12,047,775, which is a continuation of U.S. application Ser. No. 17/352,163, filed Jun. 18, 2021, entitled "CELLULAR SERVICE MANAGEMENT FOR SECONDARY MOBILE WIRELESS DEVICES," issued Jun. 27, 2023 as U.S. Pat. No. 11,689,921, which claims the benefit of U.S. Provisional Application No. 63/041,730 filed Jun. 19, 2020 of the same title, the contents of all of which are incorporated by reference herein in their entirety for all purposes.

FIELD

The described embodiments set forth techniques for cellular service management for a secondary mobile wireless device assisted by a primary mobile wireless device, including provisioning and management of electronic subscriber identity modules (eSIMs) for a secondary mobile wireless device with user authorization obtained via the primary mobile wireless device.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (cUICCs), which can provide advantages over traditional, removable UICCs. The cUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

Cellular capability continues to be added to a broad variety of wireless devices. In some cases, a wireless device can be ill-suited for management of cellular services, e.g., based on a lack of or limited display and/or input/output capability. In some cases, a wireless device can be specifically configured to require assistance from another wireless device for management of cellular services, such as for installation, modification, and/or deletion of eSIMs.

SUMMARY

This Application sets forth techniques for cellular service management for a secondary mobile wireless device assisted by a primary mobile wireless device, including provisioning and management of electronic subscriber identity modules (eSIMs) for the secondary mobile wireless device with user authorization obtained via the primary mobile wireless device. The secondary mobile wireless device can be associated with the primary mobile wireless device, such as via a common user account or via a set of linked user accounts managed by an original equipment manufacturer (OEM) or by a cellular service provider, e.g., an MNO. The secondary mobile wireless device can be configured to require assistance, such as to receive authorization, for management of one or more eSIMs for the secondary mobile wireless device. Subscribing to a cellular service for the secondary mobile wireless device can cause an eSIM to be reserved for future provisioning to an embedded universal integrated circuit card (eUICC) of the secondary mobile wireless device. The secondary mobile wireless device can receive notification of the reserved eSIM from a push notification server and subsequently obtain information about the reserved eSIM from an eSIM discovery server. The secondary mobile wireless device can provide to the primary mobile wireless device a message indicating that the reserved eSIM is available for provisioning to the secondary mobile wireless device. The primary mobile wireless device can prompt for authorization from a user of the primary mobile wireless device and respond to the secondary mobile wireless device with a first authorization message including an indication to initiate eSIM provisioning to the secondary mobile wireless device after receiving user authorization via the primary mobile wireless device. The secondary mobile wireless device can subsequently perform an eSIM provisioning handshake procedure with an MNO provisioning server to complete a two-way authentication with the MNO provisioning server. The secondary mobile wireless device can then pause provisioning of the eSIM and provide eSIM information obtained from the MNO provisioning server to the primary mobile wireless device to prompt for an additional authorization from the user of the primary mobile wireless device to allow the secondary mobile wireless device to continue the eSIM provisioning. The secondary mobile wireless device completes the eSIM provisioning, including downloading and installation of the eSIM to the eUICC of the secondary mobile wireless device, after receiving from the primary mobile wireless device a second authorization message including an indication to continue eSIM provisioning. After installation, the secondary mobile wireless device can use a monitoring procedure to determine when the eSIM has been activated by the MNO to allow using the eSIM to access cellular wireless services of the MNO by the secondary mobile wireless device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 6 illustrates an exemplary table to assist with cellular service subscription account management for a secondary mobile wireless device, according to some embodiments.

DETAILED DESCRIPTION

Figure 1:
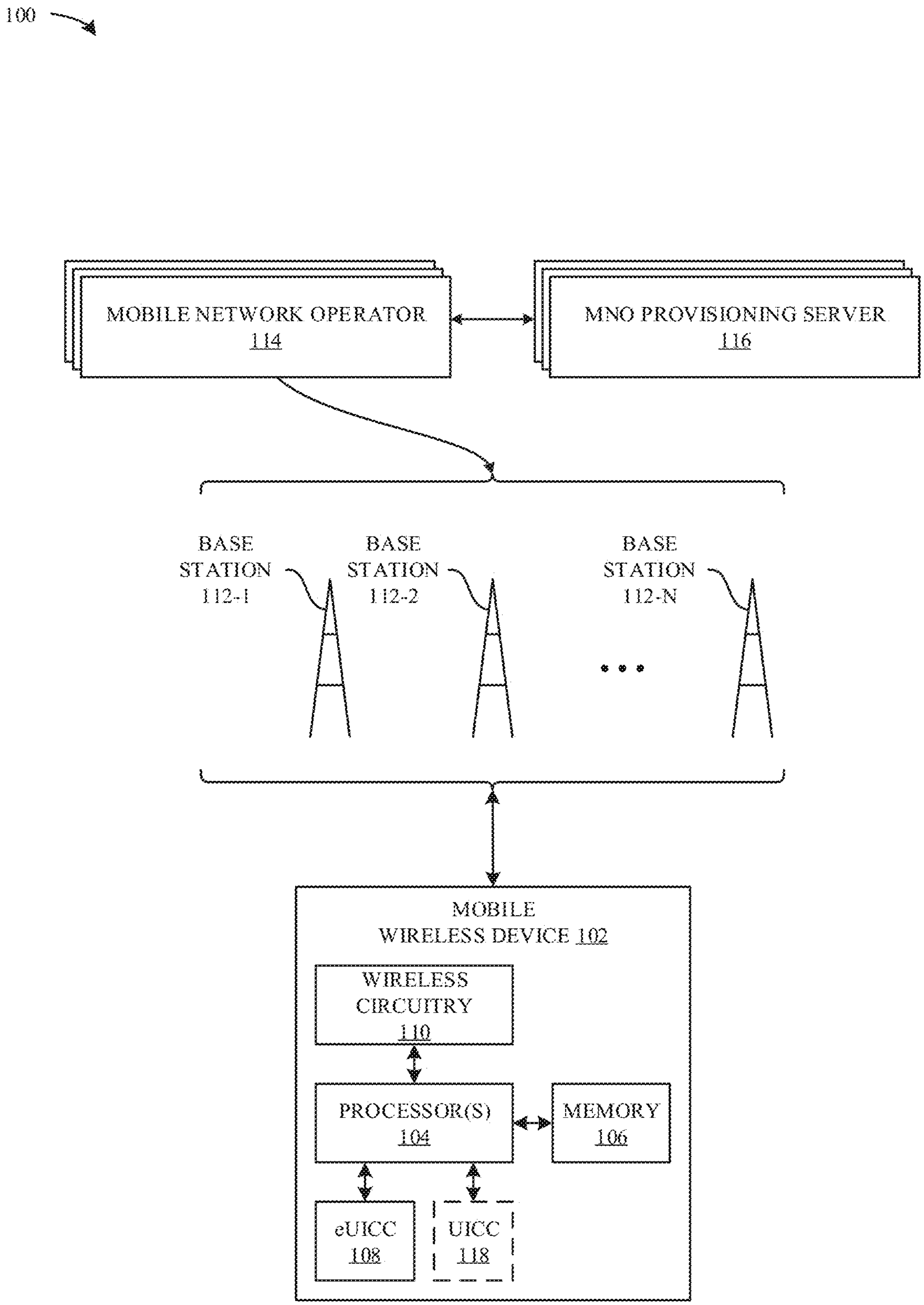
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This Application sets forth techniques for cellular service management for a secondary mobile wireless device assisted by a primary mobile wireless device, including provisioning and management of electronic subscriber identity modules (eSIMs) for the secondary mobile wireless device with user authorization obtained via the primary mobile wireless device. The secondary mobile wireless device can be associated with the primary mobile wireless device, such as via a common user account or via a set of linked user accounts managed by an original equipment manufacturer (OEM) and/or by a cellular wireless service provider, e.g., an MNO. The secondary mobile wireless device can be configured to require assistance, such as to receive authorization, for management of one or more eSIMs for the secondary mobile wireless device. Management can include provisioning, installation, modification, and deletion of the one or more eSIMs on the secondary mobile wireless device. A user can subscribe to a cellular wireless service for the secondary mobile wireless device, such as on-line, via an installed application on the secondary mobile wireless device or the primary mobile wireless device, or in-person at an OEM retail store or MNO retail outlet. Subscription to the cellular wireless service for the secondary mobile wireless device can reserve an eSIM for future provisioning to an embedded universal integrated circuit card (eUICC) of the secondary mobile wireless device. The cellular service for the secondary mobile wireless device can share a cellular wireless service account with the primary wireless device or can use a distinct cellular wireless service account. The cellular wireless service for the secondary mobile wireless device can be provided by a same mobile network operator (MNO) as for cellular wireless service available through the primary mobile wireless device. Alternatively, the cellular wireless service for the secondary mobile wireless device can use a different MNO than used for cellular wireless service for the primary mobile wireless device. Consent for management of the eSIM on the secondary mobile wireless device can require authorization by a user of the primary mobile wireless device, such as through an interface of the primary mobile wireless device. The secondary mobile wireless device and the primary mobile wireless device can be used by different users. The secondary mobile wireless device can receive notification of the reserved eSIM from a push notification server and can subsequently obtain information about the reserved eSIM from an eSIM discovery server. The secondary mobile wireless device can provide to the primary mobile wireless device a message indicating that the reserved eSIM is available for provisioning to the secondary mobile wireless device. The primary mobile wireless device can prompt for authorization from the user of the primary mobile wireless device and respond to the secondary mobile wireless device, after receipt of successful authorization, with a first authorization message that includes an indication to initiate eSIM provisioning to the secondary mobile wireless device. This first authorization message from the primary mobile wireless device occurs before the secondary mobile wireless device has authenticated an MNO provisioning server from which to download the eSIM reserved for the secondary mobile wireless device. The secondary mobile wireless device can initiate eSIM provisioning by performing an eSIM provisioning handshake procedure with the MNO provisioning server up to completion of a two-way authentication with the MNO provisioning server. The secondary mobile wireless device can then pause provisioning of the eSIM and provide eSIM information obtained from the authenticated MNO provisioning server to the primary mobile wireless device to prompt for an additional authorization from the user of the primary mobile wireless device to allow the secondary mobile wireless device to continue the eSIM provisioning. The secondary mobile wireless device completes the eSIM provisioning, including downloading and installation of the eSIM to the eUICC of the secondary mobile wireless device, after receiving from the primary mobile wireless device a second authorization message that includes an indication to continue the eSIM provisioning. The second authorization message from the primary mobile wireless device occurs after the secondary mobile wireless device has authenticated the MNO provisioning server. After installation of the eSIM, the secondary mobile wireless device can use a monitoring procedure to determine when the eSIM has been activated by the MNO to allow using the eSIM to access cellular wireless services of the MNO. The primary mobile wireless device and/or the secondary mobile wireless device can cache information (or hashed versions thereof) obtained from MNO servers, OEM servers, and/or third-party managed servers during the provisioning process to allow for subsequent re-authorization, such as to address error conditions that may occur during the eSIM provisioning process. In some embodiments, information for management of the eSIM on the secondary mobile wireless device, such as a network address, e.g., a uniform resource locator (URL) for an MNO server with which to manage cellular service for the eSIM on the secondary mobile wireless device and/or post-installation data provided to allow for password-less login to the MNO server, are aggregated from multiple sources and stored at a network-based server, e.g., at a messaging server as part of a management service for the secondary mobile wireless device provided by an original equipment manufacturer (OEM) of the secondary mobile wireless device and the primary mobile wireless device. The multiple sources can include responses from a cellular service entitlement query, e.g., an eSIM status query, performed by the primary mobile wireless device or by the secondary mobile wireless device, or a phone service account status (PSAS) query performed by the secondary mobile wireless device.

These and other embodiments are discussed below with reference to FIGS. 1-9; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a device, a wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The mobile wireless device 102 can represent a mobile computing device (e.g., an iPhone®, an iPad®, or an Apple Watch by Apple®), the base stations 112-1 to 112-*n* can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO, an eSIM can be reserved for subsequent download and installation to the eUICC 108. In some embodiments, the eUICC 108 obtains one or more eSIMs from one or more associated MNO provisioning servers 116. The MNO provisioning servers 116 can be maintained by the MNOs 114, an OEM manufacturer, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel.

The mobile wireless device 102, upon initial acquisition by a user, can lack an activated eSIM and require the user to download a functional eSIM for the MNO 114 from a corresponding MNO provisioning server 116. As part of a sales order process, the user of the mobile wireless device 102 can reserve an eSIM for downloading to the mobile wireless device 102. Authorization to download the eSIM to the mobile wireless device 102 can be obtained via another mobile wireless device 102, where both mobile wireless devices 102 are associated with a common user account, such as with a cloud-based service account, e.g., an iCloud® account. Upon activation of the eSIM, the mobile wireless device 102 can connect to the cellular wireless network of the MNO 114 to access services provided therefrom.

Figure 2:
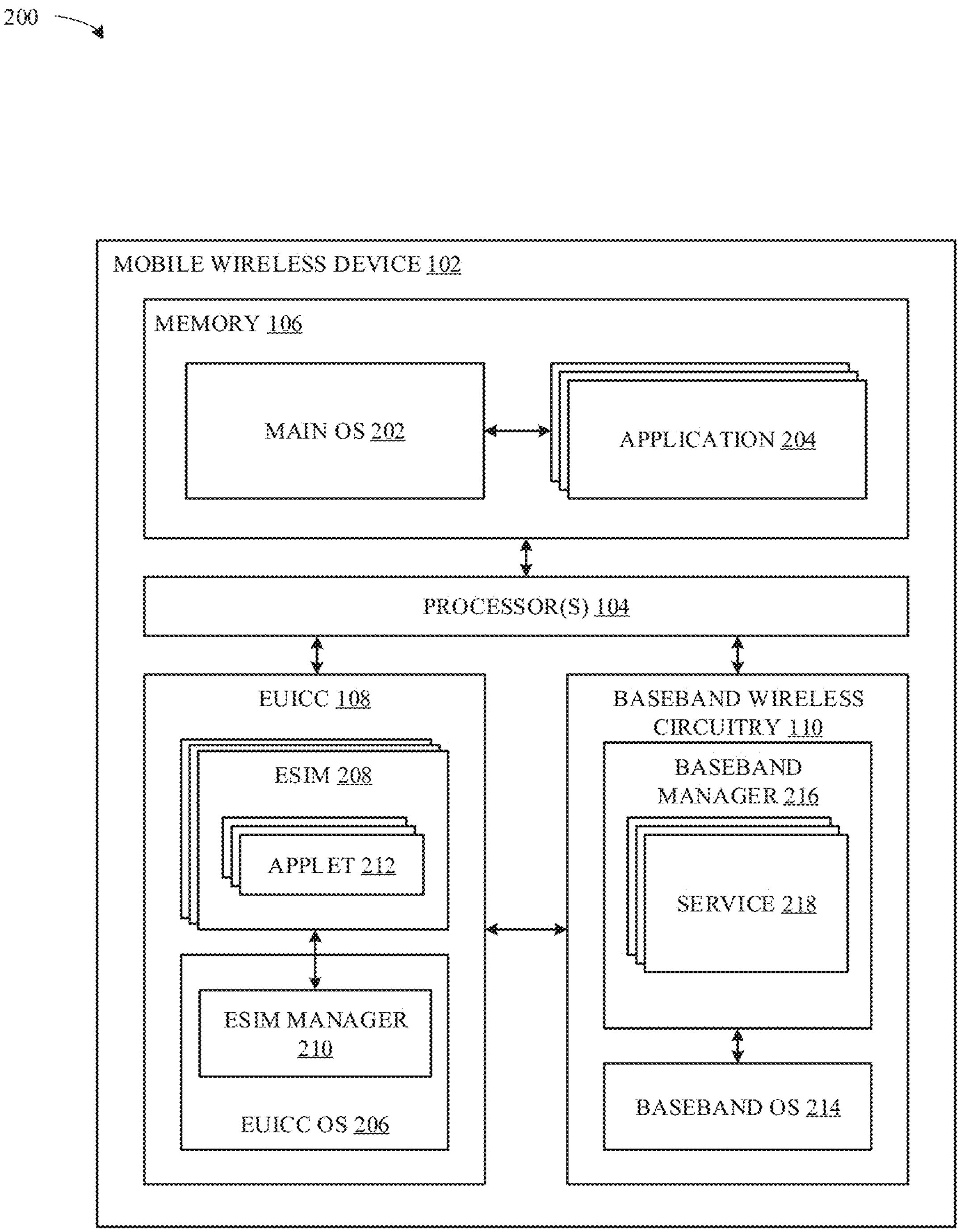
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and to provide baseband wireless circuitry 110 with access to the eSIMs 208 to provide access to wireless services for the mobile wireless device 102. The cUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the cUICC 108. For example, services 218 can be configured to manage different connections between the mobile wireless device 102 and MNOs 114 according to the different eSIMs 208 that are enabled within the cUICC 108.

Figure 3:
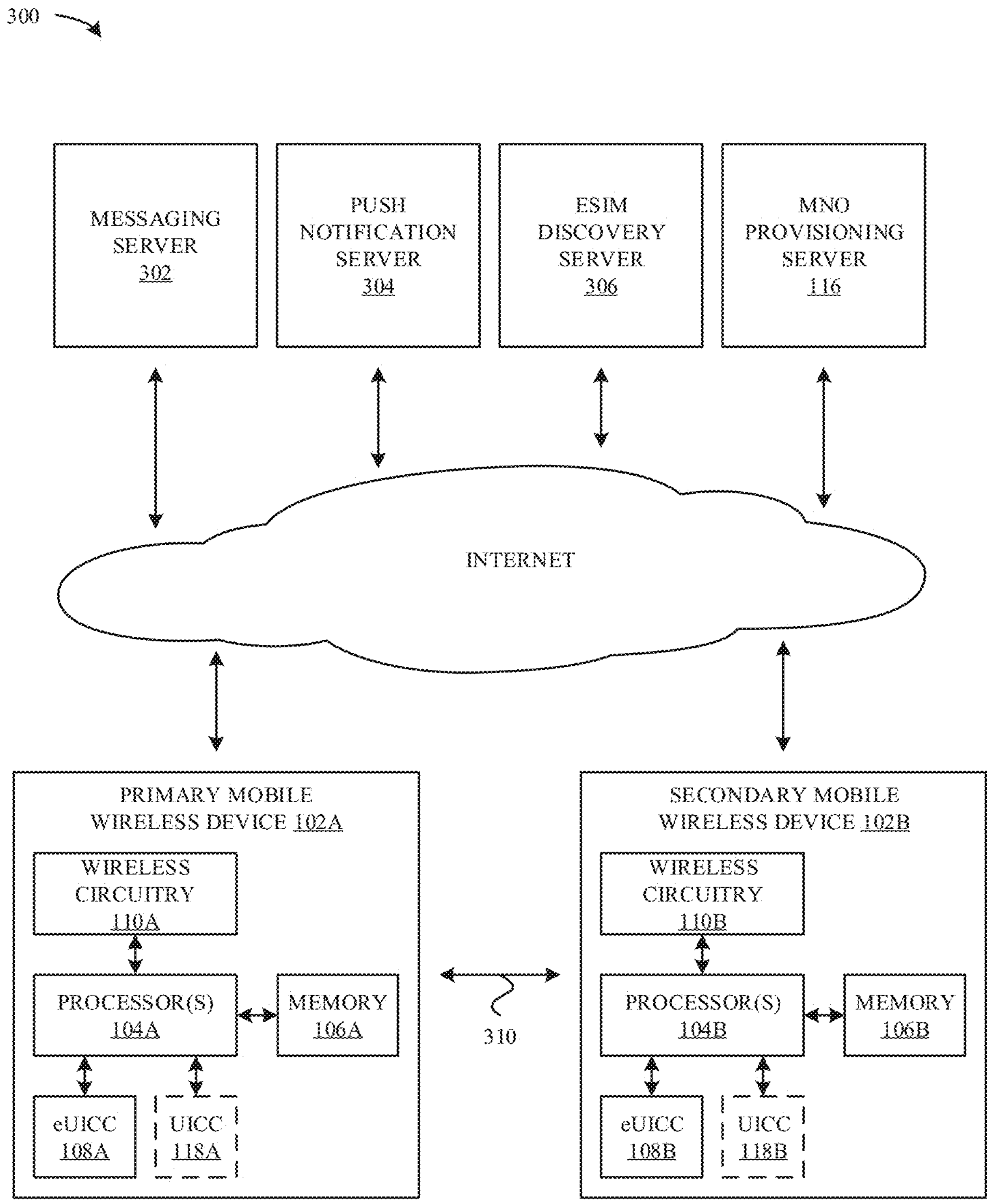
FIG. 3 illustrates a block diagram of an exemplary system for provisioning an eSIM to a secondary mobile wireless device, according to some embodiments.

FIG. 3 illustrates a diagram 300 of an exemplary system for provisioning an eSIM 208 to an cUICC 108 of a secondary mobile wireless device 102B with authorization assistance from a primary mobile wireless device 102A. The primary mobile wireless device 102A and the secondary mobile wireless device 102B can communicate with each other over a wireless connection 310, which can be a direct, local connection, such as via a wireless personal area network (WPAN), via a wireless local area network (WLAN), or via a peer-to-peer connection, or can be an indirect connection, such as via an access point of a WLAN, via an Internet data connection, via a relaying, intermediate wireless device (not shown), or via a relayed message service or alternate data connection via a network-based server. The primary and secondary mobile wireless devices 102A, 102B can also communicate with various network-based servers via an Internet data connection, which can include cellular wireless connections, in some cases, and non-cellular wireless connections, in some cases. Each of the primary mobile wireless device 102A and the secondary mobile wireless device 102B can be registered with a common user account, such as managed by a cloud-based service, e.g., an iCloud® service account, and associated with a messaging server 302, a push notification server 304 and/or additional associated network-based servers (not shown). The primary and secondary mobile wireless devices 102A and 102B can each receive push notification messages from the push notification server 304. The primary mobile wireless device 102A and the secondary mobile wireless device 102B can also communicate with an eSIM discovery server 306 to ascertain information regarding eSIMs 208 available for provisioning to their respective devices. The eSIM discovery server 306 can be managed by an original equipment manufacturer (OEM) or by a third party service, e.g., by a Global System for Mobile Communication Association (GSMA) service. As such, the eSIM discovery server 306 can provide information for multiple MNOs 114. The primary mobile wireless device 102A and the secondary mobile wireless device 102B can also communicate with an MNO provisioning server 116 from which to download one or more eSIMs 208 for installation on their respective eUICCs 108. The primary and secondary mobile wireless devices 102A, 102B can also communicate with additional network-based servers not explicitly shown in FIG. 3, such as for management of cellular services provided by MNOs 114 based on eSIMs 208 installed in cUICCs 108 of the devices.

Figure 4:
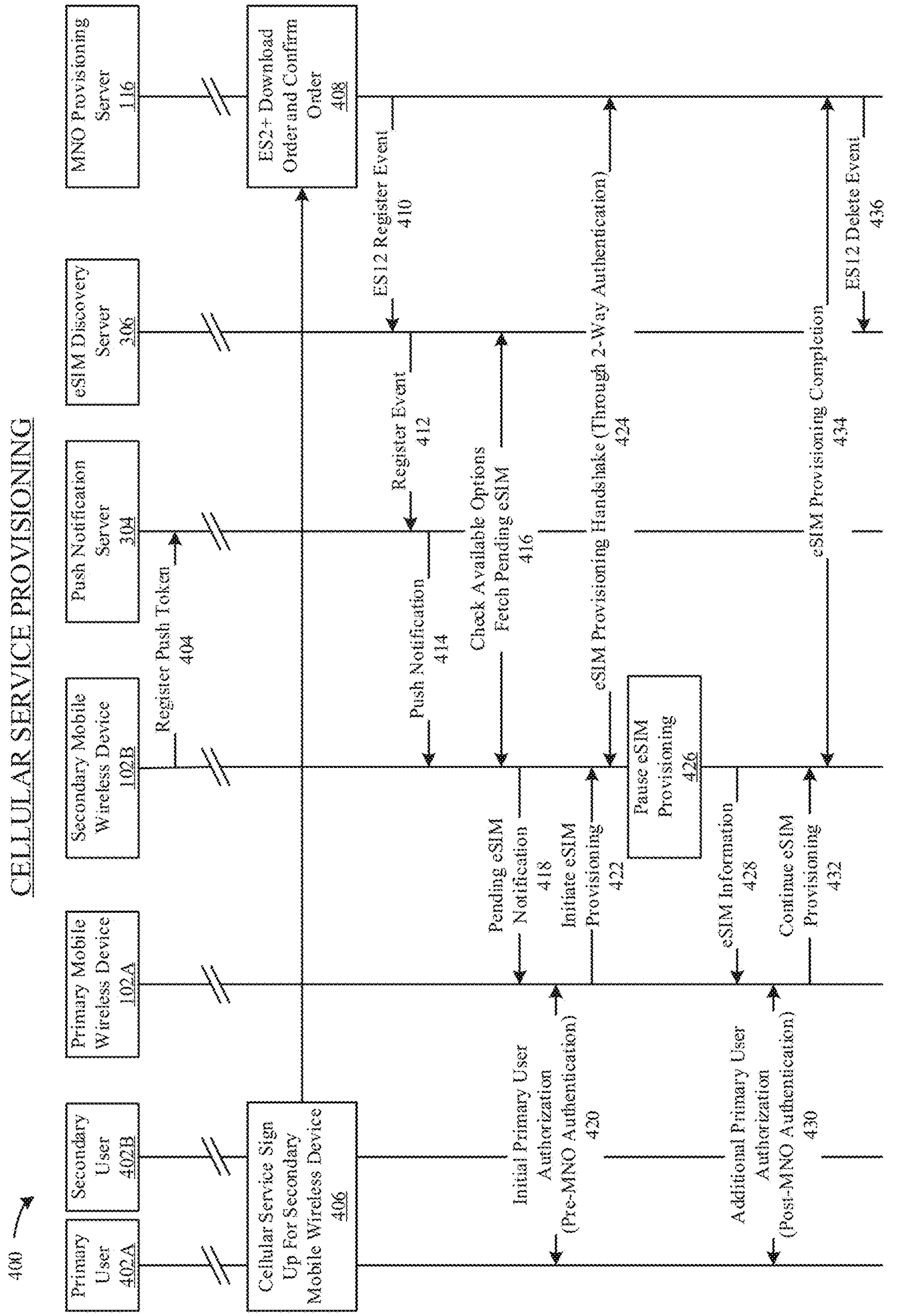
FIG. 4 illustrates an exemplary sequence of actions performed to provision an eSIM to a secondary mobile wireless device, according to some embodiments.

FIG. 4 illustrates a diagram 400 of an exemplary sequence of actions performed to provision an eSIM 208 to a secondary mobile wireless device 102B, with authorization provided by a primary mobile wireless device 102A. The primary mobile wireless device 102A can be configured for operation by a primary user 402A, while the secondary mobile wireless device 102B can be configured for operation by a secondary user 402B. At 404, the secondary mobile wireless device 102B can register with a push notification server 304, e.g., by providing a push token to the push notification server 304, in order to receive push notification messages associated with events applicable to the secondary mobile wireless device 102B. In some embodiments, the push notification server 304 is managed by an original equipment manufacturer (OEM) of the secondary mobile wireless device 102B. At 406, the primary user 402A and/or the secondary user 402B can sign up with an MNO 114 for cellular wireless service to be provided to the secondary mobile wireless device 1-2B. The primary user 402A and/or the secondary user 402B can request that a subscription to a cellular wireless service be assigned to the secondary mobile wireless device 102B via an on-line subscription process, such as on-line by interacting with a web-sheet server managed by the MNO from which cellular wireless service will be provided or by communicating with a customer service agent of the MNO 114 over a voice or data connection or in person at a retail outlet. As a result of establishing a subscription for cellular wireless service for the secondary mobile wireless device 102B, an ES2+ download order and confirmation order can be provided, at 408, to an MNO provisioning server 116 via one or more MNO infrastructure servers (not shown). The DS2+ download order can cause the MNO provisioning server 116 to reserve an eSIM 208 for provisioning to the secondary mobile wireless device 102B, and at 410, the MNO provisioning server 116 can send an ES12 register event message indicating availability of the cSIM 208 reserved for the secondary mobile wireless device 102B to an eSIM discovery server 306. At 412, the eSIM discovery server 306 can forward information from the ES12 register event message to the push notification server 304 to indicate availability of the eSIM 208 reserved for the secondary mobile wireless device 102B. The push notification server 304 can subsequently send a push notification message, at 414, to the secondary mobile wireless device 102B indicating availability of a reserved eSIM 208 ready for provisioning to the secondary mobile wireless device 102B. In some embodiments, additional or alternative triggers for eSIM installation can be sent to the secondary mobile wireless device 102B and/or to the primary mobile wireless device 102A as a result of establishing a subscription to cellular wireless service for the secondary mobile wireless device 102B. For example, a Javascript callback procedure can result from signing up for cellular wireless service for the secondary mobile wireless device 102B via web-sheet entry. At 416, the secondary mobile wireless device 102B can send a message, e.g., a check available options message, to the eSIM discovery server 306 to obtain information about the eSIM 208 reserved for the secondary mobile wireless device 102B. The eSIM discovery server 306 can respond to the message from the secondary mobile wireless device 102B with information regarding the reserved eSIM 208, such as a network address, e.g., a uniform resource locator (URL) name for the MNO provisioning server 116 from which to obtain the eSIM 208, and an identifier for the eSIM 208 reserved for the secondary mobile wireless device 102B, such as an integrated circuit card identifier (ICCID) value or a hashed version thereof. At 418, the secondary mobile wireless device 102B sends a message to the primary mobile wireless device 102A, via the connection 310, the message providing notification of the eSIM 208 reserved for the secondary mobile wireless device 102B. At 420, the primary mobile wireless device 102A can obtain initial authorization from the primary user 402A for the secondary mobile wireless device 102B and provide an indication, at 422, to the secondary mobile wireless device 102B to begin provisioning of the eSIM 208 reserved for the secondary mobile wireless device 102B. The initial authorization received by the primary mobile wireless device 102A at 420, and communicated to the secondary mobile wireless device 102B at 422, can occur before the secondary mobile wireless device 102B has performed a two-way authentication procedure with the MNO provisioning server 116. The secondary mobile wireless device 102B can be configured to require authorization from the primary mobile wireless device 102A before initiating provisioning of the eSIM 208 reserved for the secondary mobile wireless device 102B. In some embodiments, the secondary mobile wireless device 102B stores information from the initial authorization received from the primary mobile wireless device 102A at 420 to allow for automatic re-authorization (without requiring repetition of the pre-MNO authorization of 420/422 with the primary mobile wireless device 102A) should an error occur during provisioning of the eSIM 208 to the secondary mobile wireless device 102B. In some embodiments, the user authorization received from the primary mobile wireless device 102A at 420 can be stored on a memory of the secondary mobile wireless device 102B and/or on a memory of the primary mobile wireless device 102A with access to the stored user authorization being based on an indexing using an ICCID value (or a hashed version thereof) for the eSIM 208. Responsive to receipt of the message to initiate eSIM provisioning, the secondary mobile wireless device 102B, at 424, can establish a secure connection to the MNO provisioning server 116 and begin eSIM provisioning by performing an eSIM provisioning handshake procedure with the MNO provisioning server 116, e.g., up to and through a two-way authentication process in which the secondary mobile wireless device 102B authenticates with the MNO provisioning server 116, and the MNO provisioning server 116 authenticates with the secondary mobile wireless device 102B. After completing of the two-way authentication, at 426, the secondary mobile wireless device 102B can be configured to pause the provisioning of the eSIM 208 and await an additional authorization from the primary mobile wireless device 102A. At 428, the secondary mobile wireless device 102B can provide additional eSIM information to the primary mobile wireless device 102A, such as meta-data information about the eSIM 208 obtained from the eSIM discovery server 306 and/or from the MNO provisioning server 116. In some embodiments, the meta-data information for the eSIM 208 can include at least an authenticated name of the MNO 114 that is provisioning the eSIM 208 to the secondary mobile wireless device 102B. At 430, the primary mobile wireless device 012A can obtain an additional authorization from the primary user 402A and provide an indication, at 432, to the secondary mobile wireless device 102B to continue provisioning of the eSIM 208 reserved for the secondary mobile wireless device 102B. The additional authorization received by the primary mobile wireless device 102A at 430, and communicated to the secondary mobile wireless device 102B at 432, can occur after the secondary mobile wireless device 102B has performed the two-way authentication procedure with the MNO provisioning server 116. The secondary mobile wireless device 102B can be configured to require the additional authorization from the primary mobile wireless device 102A before continuing provisioning of the eSIM 208 reserved for the secondary mobile wireless device 102B. In some embodiments, the secondary mobile wireless device 102B stores information from the additional authorization received from the primary mobile wireless device 102A to allow for automatic re-authorization (without requiring repetition of the post-MNO authorization of 430/432 with the primary mobile wireless device 102A) should an error occur during provisioning of the eSIM 208 to the secondary mobile wireless device 102B. In some embodiments, the additional user authorization received from the primary mobile wireless device 102A at 430 can be stored on a memory of the secondary mobile wireless device 102B and/or on a memory of the primary mobile wireless device 102A and can be accessed based on indexing by an ICCID value (or hashed version thereof) for the eSIM 208. Responsive to receipt of the message to continue eSIM provisioning, the secondary mobile wireless device 102B can, at 434, continue provisioning of the eSIM 208 from the MNO provisioning server 116 to download and install the eSIM 208 on an eUICC 108 of the secondary mobile wireless device 102B. The secondary mobile wireless device 102B can provide an indication upon completion of the eSIM provisioning to the MNO provisioning server 116, which can cause the MNO provisioning server 116 to send an ES12 delete event message 436 to the eSIM discovery server 306 to indicate that successful provisioning and installation of the eSIM 208 to the secondary mobile wireless device 102B has occurred. The MNO provisioning server 116 can also send messages to applicable MNO infrastructure servers (not shown) to indicate successful eSIM provisioning and cause the eSIM 208 to become active for providing cellular wireless service access for the secondary mobile wireless device 102B. Propagation of the messages to activate the eSIM 208 for the secondary mobile wireless device 102B can take a variable amount of time based on loading and network traffic for applicable network-based servers. Propagation time may also vary for different MNOs 114. To accommodate variability in activation of the eSIM 208 installed to the eUICC 108, the secondary mobile wireless device 102B can use a monitor mode mechanism as detailed further in FIG. 5 to retest whether activation of the eSIM 208 is complete.

In some embodiments, an automatic error recovery procedure can be used to restart, continue, and/or complete eSIM provisioning to the secondary mobile wireless device 102B, e.g., based on a stored user authorization previously obtained and stored at the primary mobile wireless device 102A and/or at the secondary mobile wireless device 102B. Reserved eSIMs 208, available for provisioning from the MNO provisioning server 116, for which provisioning has not completed, can be checked against stored user authorization information to allow for automatic installation of the reserved eSIMs 208 when user authorization has already been obtained previously. In some embodiments, a procedure requiring one or more user authorizations via a primary mobile wireless device 102A can be used for management of an installed cSIM 208 on an eUICC 108 of the secondary mobile wireless device 102B, such as for changing service plan characteristics, e.g., altering a data allocation, adding international service, or the like. As with the initial installation of an cSIM 208 to the cUICC 108 of the secondary mobile wireless device 102B, a user of the secondary mobile wireless device 102B can be restricted from altering a service plan for the cSIM 208 until one or more authorization indications are received from primary mobile wireless device 102A.

Figure 5:
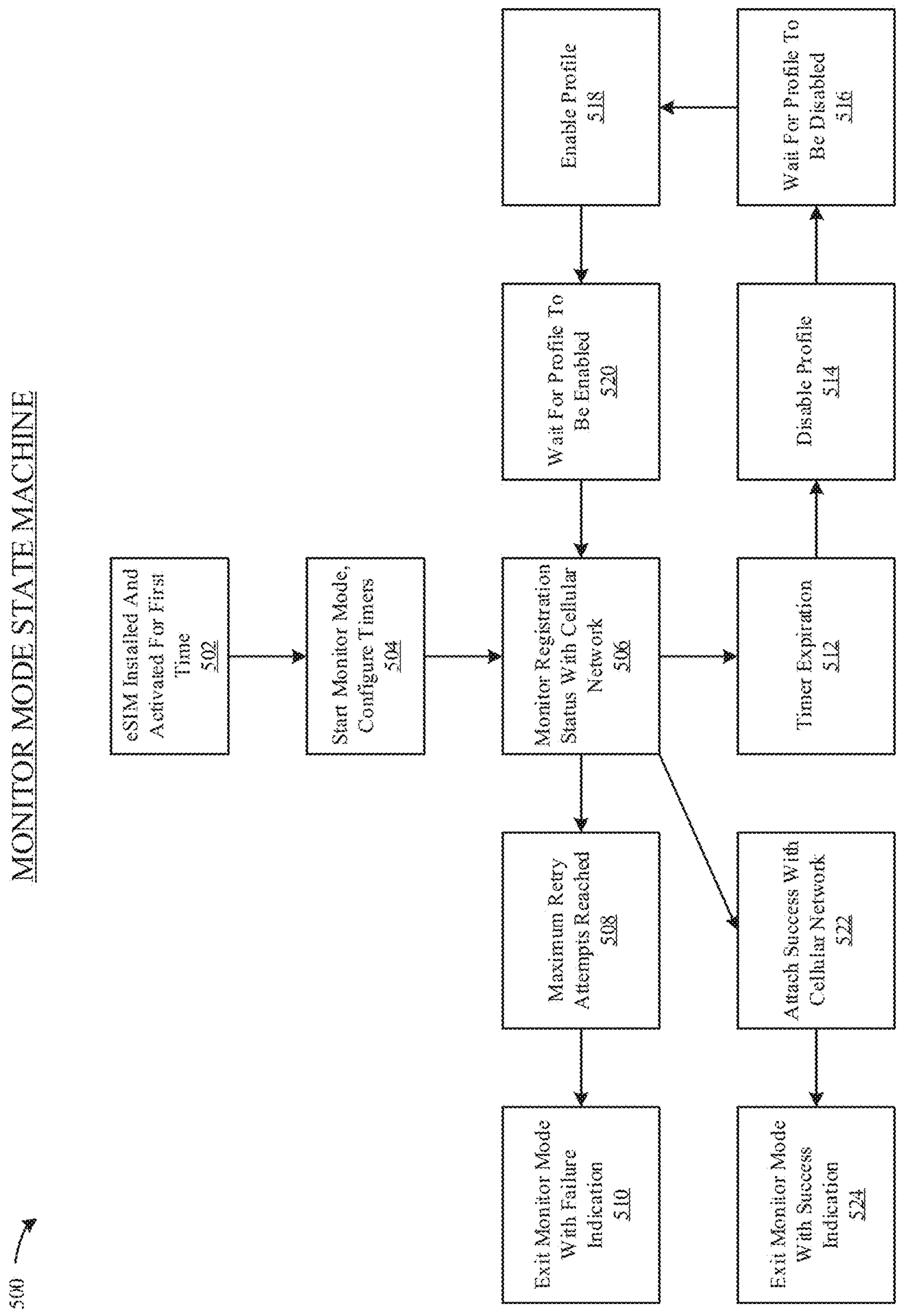
FIG. 5 illustrates an exemplary monitor mode state machine for initial activation of an eSIM for a secondary mobile wireless device, according to some embodiments.

FIG. 5 illustrates a diagram 500 of an exemplary monitor mode state machine for initial activation of an eSIM 208 for a secondary mobile wireless device 102B. At 502, an eSIM 208 is installed and activated for a first time on a secondary mobile wireless device 102B. At 504, the secondary mobile wireless device 102B initiates the monitor mode state machine and configures one or more timers. At 506, the secondary mobile wireless device 102B monitors registration status for the secondary mobile wireless device 102B to determine whether the secondary mobile wireless device 102B has successfully attached to a cellular wireless network of the MNO 114 associated with the newly installed eSIM 208. Activation of the eSIM 208 in all applicable servers of an infrastructure network of the MNO 114 may require some time to complete, and as such attachment to an access portion of the cellular wireless network of the MNO 114 associated with the cSIM 208 cannot be guaranteed to succeed immediately after completion of installation of the cSIM 208 at the secondary mobile wireless device 102B. At 506, the secondary mobile wireless device 102B can attempt to attach to an access portion of the cellular wireless network of the MNO 114. Successful attachment to the cellular wireless network of the MNO 114, indicated at 522, causes the secondary mobile wireless device 102B to exit the monitor mode with an attachment success indication at 524. Attachment failure at 506 causes the secondary mobile wireless device 102B to remain in a monitor mode and upon expiration of a timer at 512, the secondary mobile wireless device 102B disables the eSIM (profile) 208 at 514, waits for disablement of the eSIM (profile) 208 to complete at 516, subsequently re-enables the eSIM (profile) 208 at 518, and then waits for enablement of the eSIM (profile) 208 to complete at 520 before re-attempting attachment of the secondary mobile wireless device 102B to the cellular wireless network of the MNO 114 again at 506. When the secondary mobile wireless device 102B has re-attempted attachment to the cellular wireless network of the MNO 114 multiple times, and a maximum number of retry attempts is reached, at 508, the secondary mobile wireless device 102B, at 510, exits the monitor mode with a failure indication. In some embodiments, the secondary mobile wireless device 102B provides an indication of attachment success and/or the attachment failure, such as via a display of the secondary mobile wireless device 102B (or via a message sent to the primary mobile wireless device 102A).

The monitor mode state machine illustrated in FIG. 5 can compensate for propagation delay between i) when an eSIM 208 completes installation on the secondary mobile wireless device 102B and ii) when the cellular wireless network of the MNO 114 associated with the eSIM 208 completes activation of the newly installed eSIM 208. The secondary mobile wireless device 102B can assume the newly installed eSIM 208 is ready upon completion of the eSIM provisioning at 434 (in FIG. 4); however, propagation of the eSIM installation completion throughout the cellular wireless network of the MNO 114 can take tens of seconds or up to several minutes depending on network loading. Attempting to attach to an access portion of the cellular wireless network of the MNO 114 by the secondary mobile wireless device 102B using credentials of the eSIM 208, before propagation of the eSIM activation completes, can result in a non-access stratum (NAS) signaling message indicating a fatal rejection cause. Specifications for NAS signaling published by the 3rd Generation Partnership Project (3GPP) can disallow re-attachment by the secondary mobile wireless device 102B to the cellular wireless network of the MNO 114 using the same credentials from the eSIM 208 unless the secondary mobile wireless device 102B is rebooted. Reboot of the secondary mobile wireless device 102B, which may be required to occur repeatedly until eSIM activation completes, is not preferred from a user experience perspective. The secondary mobile wireless device 102B can instead disable and then subsequently re-enable the eSIM 208, repeating as needed with back-off timers to delay each attempt until successful attachment occurs or a maximum number of retries is reached.

FIG. 6 illustrates a table 600 summarizing several different configurations that can use different sources for obtaining one or more network addresses, e.g., a URL, for an MNO service account management server with which to interact (by the primary mobile wireless device 102A and/or the secondary mobile wireless device 102B) when managing the cellular service subscription for the cSIM 208 on the cUICC 108 of the secondary mobile wireless device 102B, and a URL for obtaining emergency service information applicable to the secondary mobile wireless device 102B. In a first configuration, the primary mobile wireless device 102A and the secondary mobile wireless device 102B use identical MNOs 114, e.g., the eSIM 208 of the secondary mobile wireless device 102B is associated with an MNO 114 with which a separate cSIM 208 (or SIM) of the primary mobile wireless device 102A uses as a primary wireless cellular service account with the MNO 114. For the first configuration, a manage account URL for the MNO service account management server can be obtained by the primary mobile wireless device 102A, e.g., using a get SIM status query message that obtains details about a cellular service subscription, including a cellular profile's status and the manage account URL used for cellular service management of the eSIM 208 on the eUICC 108 of the secondary mobile wireless device 102B. The manage account URL can be stored at a network-based server that is accessible to both the primary mobile wireless device 102A and the secondary mobile wireless device 102B. In a second configuration, the primary mobile wireless device 102A and the secondary mobile wireless device 102B are associated with an identical MNO wireless cellular service account and cross communication is supported. For the second configuration, a manage account URL for the MNO service account management server obtained most recently by the primary mobile wireless device 102A, using a get SIM status query message, or by the secondary mobile wireless device 102B, using a get SIM status query message, and stored at the network-based server can be used. In a third configuration, the primary mobile wireless device 102A and the secondary mobile wireless device 102B can be associated with distinct MNO cellular service accounts, e.g., when the eSIM 208 of the secondary mobile wireless device 102B is associated with a different MNO 114 from that used for cellular wireless service by the primary mobile wireless device 102A, or when the eSIM 208 of the secondary mobile wireless device 102B uses a different cellular service subscription account with the same MNO as the primary mobile wireless device 102A, and cross communication between distinct accounts is supported. For the third configuration, a manage account URL for the MNO service account management server obtained by the secondary mobile wireless device 102B, e.g., using a get SIM status query message, and stored at the network-based server can be used for cellular service management for the cSIM 208 on the cUICC 108 of the secondary mobile wireless device 102B. In a fourth configuration, the primary mobile wireless device 102A and the secondary mobile wireless device 102B can be associated with distinct MNO cellular service accounts, e.g., when the eSIM 208 of the secondary mobile wireless device 102B is associated with a different MNO 114 from that used for cellular wireless service by the primary mobile wireless device 102A, or the secondary mobile wireless device 102B has a distinct cellular service account from the primary mobile wireless device 102A, and cross communication between distinct accounts is not supported. For the fourth configuration, an address update URL for an emergency services management server obtained by the secondary mobile wireless device 102B, e.g., using a get phone service account status (PSAS) message, and stored at the network-based server can be used for cellular service management for the cSIM 208 on the cUICC 108 of the secondary mobile wireless device 102B. A PSAS query can be used to obtain status for Wi-Fi calling and a URL used for updating an emergency address, in some embodiments.

Figure 7:
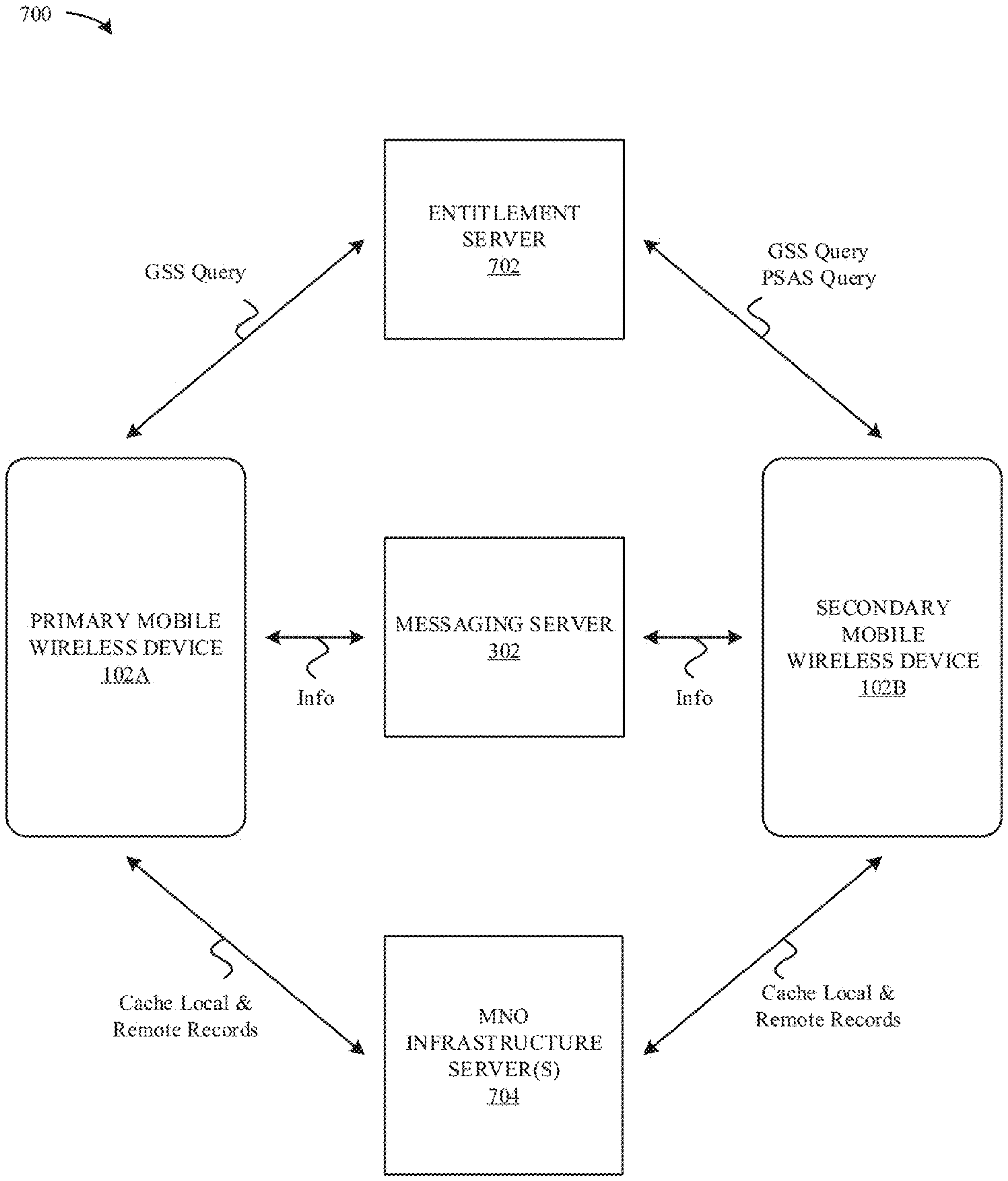
FIG. 7 illustrates exemplary communication of information for cellular service subscription account management for a secondary mobile wireless device, according to some embodiments.

FIG. 7 illustrates a diagram 700 of exemplary communication of information for cellular service subscription account management for a secondary mobile wireless device 102B. The primary mobile wireless device 102A can obtain information from an entitlement server 702 of an MNO 114, e.g., using a get SIM status (GSS) query, and store a portion of the information obtained at the messaging server 302 (or at one or more other network-accessible servers not shown) to make the information available to the secondary mobile wireless device 102B. The primary mobile wireless device 102A can also cache and obtain local and remote records from one or more infrastructure servers 704 and store a portion of the information from the local/remote records at the messaging server 302. Similarly, the secondary mobile wireless device 102B can obtain information from an entitlement server 702 of an MNO 114, e.g., using a GSS query and/or a PSAS query, and store a portion of the information obtained at the messaging server 302 to make the information available to the primary mobile wireless device 102A. The secondary mobile wireless device 102B can also cache and obtain local and remote records from one or more infrastructure servers 704 and store a portion of the information from the local/remote records at the messaging server 302. In some embodiments, information obtained and stored can include information to allow for management of cellular service accounts of the secondary mobile wireless device 102B by the primary mobile wireless device 102A and/or by the secondary mobile wireless device 102B. In some embodiments, information for management of cellular service accounts can include MNO server addresses, e.g., URLs, eSIM information (e.g., ICCID values and/or hashed versions thereof), and/or tokens for account access, such as to allow for password access to cellular service account management by the primary mobile wireless device 102A and/or the by the secondary mobile wireless device 102B. In some embodiments, access to cellular service account management, e.g., via an application resident on the primary mobile wireless device 102A and/or on the secondary mobile wireless device 102B, can use information accessible via the messaging server 302. In some embodiments, information can be refreshed by the primary mobile wireless device 102A, e.g., using a GSS query, and/or by the secondary mobile wireless device 102B, e.g., using a GSS query or a PSAS query, when information previously obtained and stored is older than a defined time duration, e.g., more than 12 hours since a previous refresh.

Figure 8A:
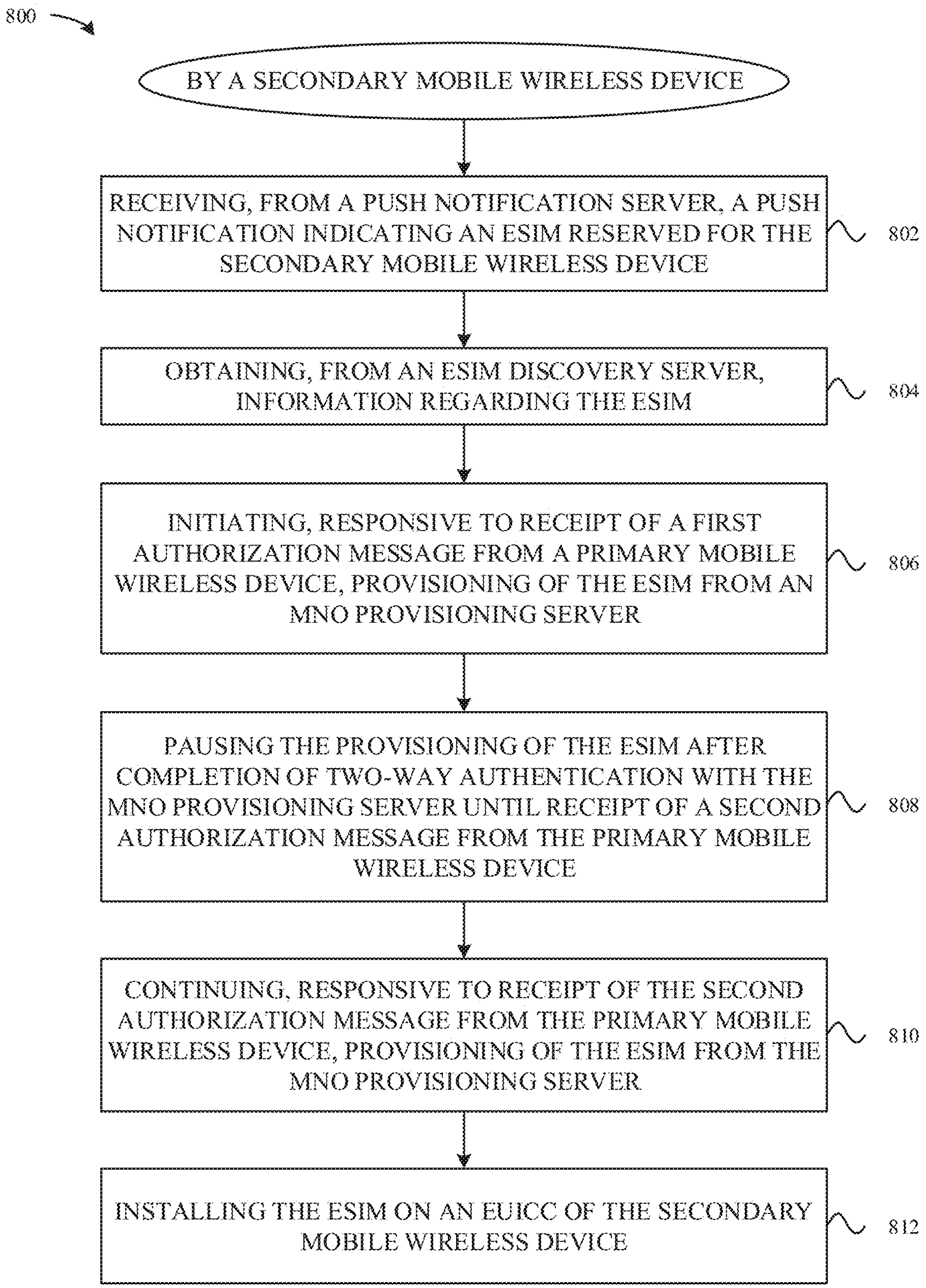
FIG. 8A illustrates a flowchart of an exemplary method performed by a secondary mobile wireless device to provision and activate an eSIM to the secondary mobile wireless device, according to some embodiments.

FIG. 8A illustrates a diagram 800 of a flowchart for an exemplary method performed by a secondary mobile wireless device 102B to provision an eSIM 208 to an eUICC 108 of the secondary mobile wireless device 102B. At 802, the secondary mobile wireless device 102B receives, from a push notification server 304, a push notification indicating an eSIM 208 reserved for the secondary mobile wireless device 102B. At 804, the secondary mobile wireless device 102B obtains, from an eSIM discovery server 306, information regarding the eSIM 208 reserved for the secondary mobile wireless device 102B. At 806, the secondary mobile wireless device initiates, responsive to receipt of a first authorization message from a primary mobile wireless device 102A, provisioning of the eSIM 208 from an MNO provisioning server 116. At 808, the secondary mobile wireless device 102B pauses the provisioning of the eSIM 208 after completing a two-way authentication with the MNO provisioning server 116 and until receiving a second authorization message from the primary mobile wireless device 102A. At 810, the secondary mobile wireless device 102B continues, responsive to receipt of the second authorization message from the primary mobile wireless device 102A, provisioning of the eSIM 208 from the MNO provisioning server 116. At 812, the secondary mobile wireless device 102B installs the eSIM 208 on the eUICC 108 of the secondary mobile wireless device 102B.

In some embodiments, the first authorization message indicates receipt of an initial authorization for eSIM provisioning from a user of the primary mobile wireless device 102A, e.g., a primary user 402A. In some embodiments, the second authorization message indicates receipt of an additional authorization for eSIM provisioning from the user of the primary mobile wireless device 102A, e.g., from the primary user 402A. In some embodiments, the first authorization message is received before authentication of the MNO provisioning server 116 by the secondary mobile wireless device 102B, and the second authorization message is received after authentication of the MNO provisioning server 116 by the secondary mobile wireless device 102B. In some embodiments, the information regarding the eSIM 208 includes an integrated circuit card identifier (ICCID) value (or hashed version thereof) for the eSIM 208 reserved for the secondary mobile wireless device 102B based on establishing a subscription for cellular service for the secondary mobile wireless device 102B. In some embodiments, the information regarding the eSIM 208 further includes an cUICC identifier (EID) for the eUICC 108 on which to install the cSIM 208 reserved for the secondary mobile wireless device 102B. In some embodiments, the information regarding the eSIM 208 further includes a uniform resource locator (URL) for the MNO provisioning server 116 from which to download the eSIM 208 reserved for the secondary mobile wireless device 102B.

In some embodiments, the secondary mobile wireless device 102B sends, to the MNO provisioning server 116, an indication of successful installation of the eSIM 208 on the cUICC 108 of the secondary mobile wireless device 102B. In some embodiments, the secondary mobile wireless device 102B attempts to attach to a cellular wireless network associated with the MNO 114 using the eSIM 208, and, responsive to receipt of a device attach failure message from the cellular wireless network, executes a monitor mode process to retry attaching to the cellular wireless network until successful attachment occurs or a maximum number of retry attempts is reached. In some embodiments, executing the monitor mode process by the secondary mobile wireless device 102B includes i) configuring a timer for the monitor mode process, ii) monitoring for successful attachment to the cellular wireless network by attempting to attach to the cellular wireless network and observing corresponding responses received, and iii) while no successful attachment occurs and before the maximum number of retry attempts is reached, after expiration of the timer, disabling and re-enabling the eSIM 208 before continuing to monitor for successful attachment to the cellular wireless network.

In some embodiments, the primary mobile wireless device 102A and the secondary mobile wireless device 102B share a common user account, e.g., associated with a cloud-based service, such as iCloud® or the like. In some embodiments, the primary mobile wireless device 102A and the secondary mobile wireless device 102B have distinct, linked user accounts associated with a cloud-based service. In some embodiments, the primary mobile wireless device 102A and the secondary mobile wireless device 102B share a common cellular wireless service subscription account of the MNO 114. In some embodiments, the primary mobile wireless device 102A and the secondary mobile wireless device 102B each have distinct cellular wireless service subscription accounts with the MNO 114. In some embodiments, the primary mobile wireless device 102A and the secondary mobile wireless device 102B each have distinct cellular wireless service subscription accounts with different MNOs 114.

Figure 8B:
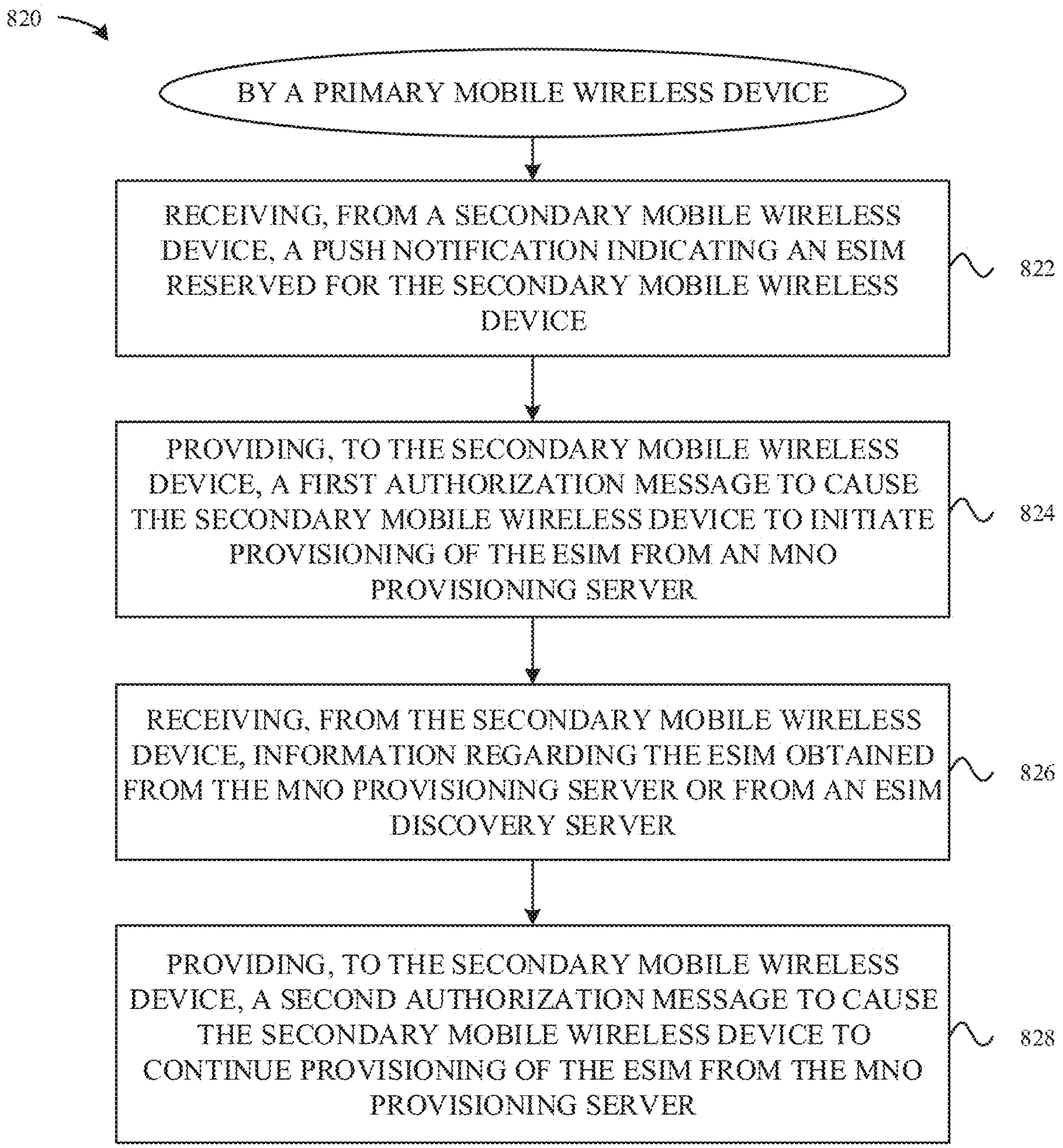
FIG. 8B illustrates a flowchart of an exemplary method performed by a primary mobile wireless device to provision an eSIM to a secondary mobile wireless device, according to some embodiments.

FIG. 8B illustrates a diagram 820 of a flowchart for an exemplary method performed by a primary mobile wireless device 102A to authorize provisioning an eSIM 208 to an eUICC 108 of a secondary mobile wireless device 102B. At 822, the primary mobile wireless device 102A receives, from the secondary mobile wireless device 102B, a push notification indicating an eSIM 208 reserved for the secondary mobile wireless device 102B. At 824, the primary mobile wireless device 102A provides, to the secondary mobile wireless device 102B, a first authorization message to cause the secondary mobile wireless device 102B to initiate provisioning of the eSIM 208 from an MNO provisioning server 116. At 826, the primary mobile wireless device 102A receives, from the secondary mobile wireless device 102B, information regarding the eSIM 208 obtained from the MNO provisioning server 116 or from an eSIM discovery server 306. At 828, the primary mobile wireless device 102A, provides, to the secondary mobile wireless device 102B, a second authorization message to cause the secondary mobile wireless device 102B to continue provisioning of the eSIM 208 from the MNO provisioning server 116. In some embodiments, the first and second authorization messages indicate authorization by a primary user 402A of the primary mobile wireless device 102A for eSIM provisioning to proceed for the secondary mobile wireless device 102B.

In some embodiments, the first authorization message is provided to the secondary mobile wireless device 102B responsive to receipt of an initial authorization from a primary user 402A of the primary mobile wireless device 102A. In some embodiments, the second authorization message is provided to the secondary mobile wireless device 102B responsive to receipt of an additional authorization from the primary user 402A of the primary mobile wireless device 102A. In some embodiments, the first authorization message is provided to the secondary mobile wireless device 102B before authentication of the MNO provisioning server 116 by the secondary mobile wireless device 102B. In some embodiments, the second authorization message is provided to the secondary mobile wireless device 120B after authentication of the MNO provisioning server 116 by the secondary mobile wireless device 102B. In some embodiments, the information regarding the eSIM 208 includes an authenticated name of the MNO 114 that is provisioning the eSIM 208 to the secondary mobile wireless device 102B. In some embodiments, the primary mobile wireless device 102A and the secondary mobile wireless device 102B share a common user account, e.g., associated with a cloud-based service, such as iCloud® or the like. In some embodiments, the primary mobile wireless device 102A and the secondary mobile wireless device 102B have distinct, linked user accounts associated with a cloud-based service. In some embodiments, the primary mobile wireless device 102A and the secondary mobile wireless device 102B share a common cellular wireless service subscription account of the MNO 114. In some embodiments, the primary mobile wireless device 102A and the secondary mobile wireless device 102B each have distinct cellular wireless service subscription accounts with the MNO 114. In some embodiments, the primary mobile wireless device 102A and the secondary mobile wireless device 102B each have distinct cellular wireless service subscription accounts with different MNOs 114.

Figure 9:
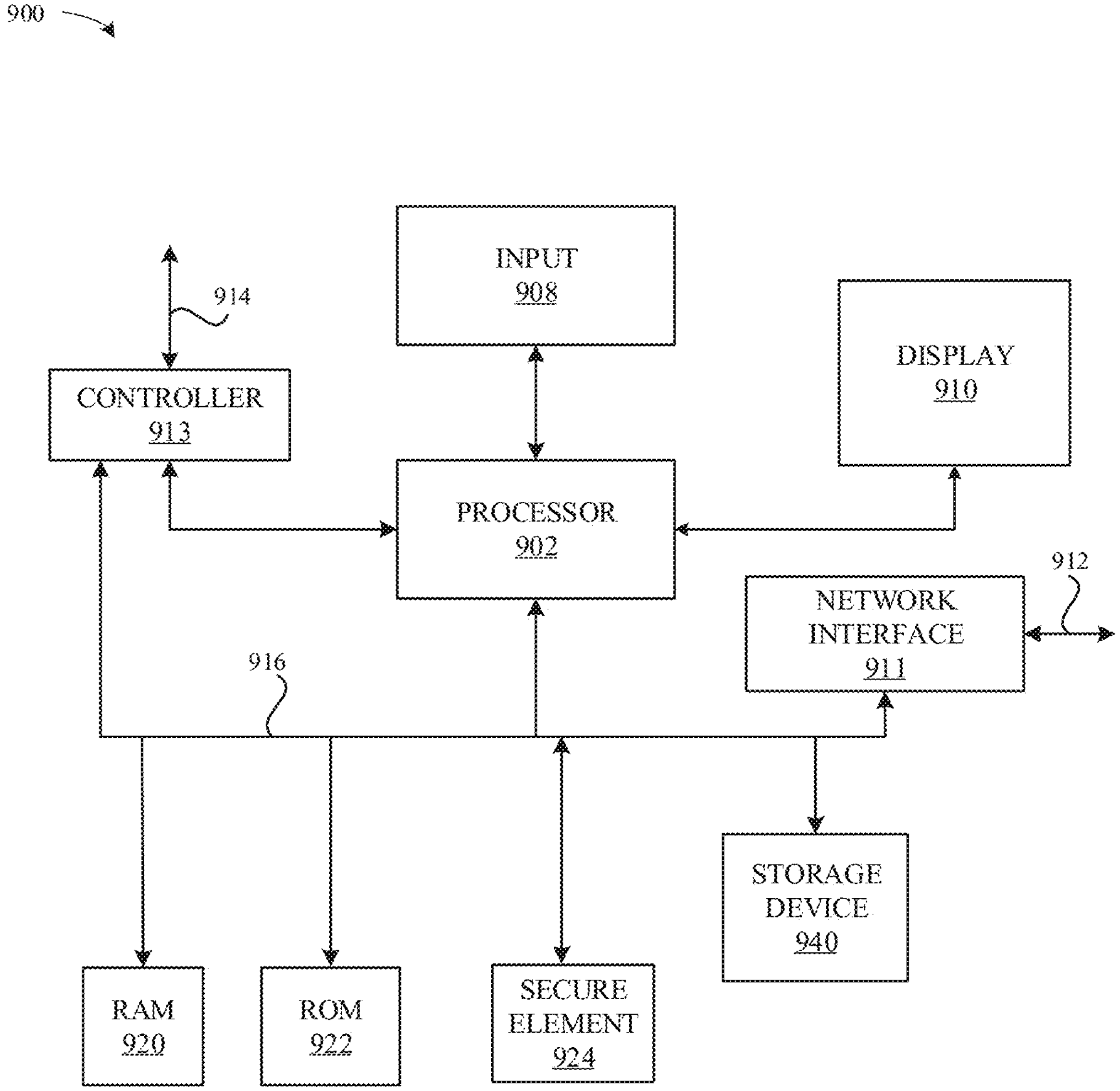
FIG. 9 illustrates a block diagram of exemplary elements of a mobile wireless device, according to some embodiments.

FIG. 9 illustrates a detailed view of a representative computing device 900 that can be used to implement various methods described herein, according to some embodiments. In particular, the detailed view illustrates various components that can be included in the mobile wireless device 102, the primary mobile wireless device 102A, and/or the secondary mobile wireless device 102B. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 that can be controlled by the processor 902 to display information to the user. A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that communicatively couples to a data link 912. In the case of a wireless connection, the network/bus interface 911 can include a wireless transceiver.

The computing device 900 also includes a storage device 940, which can comprise a single disk or a plurality of disks (e.g., hard drives), and includes a storage management module that manages one or more partitions within the storage device 940. In some embodiments, storage device 940 can include flash memory, semiconductor (solid state) memory or the like. The computing device 900 can also include a Random Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900. The computing device 900 can further include a secure element (SE) 924, which can represent secure storage for cellular wireless system access by the mobile wireless device 102, the primary mobile wireless device 102A, and/or the secondary mobile wireless device 102B.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for cellular service management for a secondary wireless device, the method comprising:

obtaining, from an entitlement server, information records for management of a cellular service account of the secondary wireless device; and storing, at a messaging server accessible to a primary wireless device associated with the secondary wireless device and to the secondary wireless device, the information records for management of the cellular service account of the secondary wireless device, wherein the information records for management of the cellular service account of the secondary wireless device include: i) a management account universal record locator (URL) for a mobile network operator (MNO) account management server at which to manage the cellular service account of the secondary wireless device, and ii) account information by which to access the cellular service account of the secondary wireless device.

2. The method of claim 1, further comprising:

refreshing the information records for management of the cellular service account of the secondary wireless device by obtaining updated information records from the entitlement server and storing the updated information records at the messaging server when the information records stored at the messaging server are older than a defined time duration.

3. The method of claim 1, wherein:

the primary wireless device and the secondary wireless device each have cellular service accounts with an identical MNO; and the information records are obtained from the entitlement server by the primary wireless device using a get subscriber identity module (SIM) status query.

4. The method of claim 1, wherein:

the primary wireless device and the secondary wireless device each share a common cellular service account at an MNO; and the information records are obtained from the entitlement server by the primary wireless device or by the secondary wireless device using a get SIM status query.

5. The method of claim 1, wherein:

the primary wireless device and the secondary wireless device each have distinct cellular service accounts;

cross communication between the distinct cellular service accounts is supported; and the information records are obtained from the entitlement server by the secondary wireless device using a get SIM status query.

6. The method of claim 5, wherein the distinct cellular service accounts of the primary wireless device and the secondary wireless device are each associated with a different MNO.

7. The method of claim 5, wherein the distinct cellular service accounts of the primary wireless device and the secondary wireless device are each associated with an identical MNO.

8. The method of claim 1, wherein the information records for management of the cellular service account of the secondary wireless device further include a URL for obtaining emergency service information applicable to the secondary wireless device.

9. The method of claim 1, wherein the account information by which to access the cellular service account of the secondary wireless device includes: i) an international circuit card identifier (ICCID) value or a hashed version thereof for an electronic SIM (eSIM) of the secondary wireless device, and ii) a token for access to the cellular service account of the secondary wireless device.

10. An apparatus configured for cellular service management for a secondary wireless device, the apparatus comprising a processor communicatively coupled to a memory storing instructions that configure a primary wireless device to perform actions including:

obtaining, from an entitlement server, information records for management of a cellular service account of the secondary wireless device; and storing, at a messaging server accessible to the secondary wireless device, the information records for management of the cellular service account of the secondary wireless device, wherein the information records for management of the cellular service account of the secondary wireless device include: i) a management account universal record locator (URL) for a mobile network operator (MNO) account management server at which to manage the cellular service account of the secondary wireless device, and ii) account information by which to access the cellular service account of the secondary wireless device.

11. The apparatus of claim 10, further comprising:

refreshing the information records for management of the cellular service account of the secondary wireless device by obtaining updated information records from the entitlement server and storing the updated information records at the messaging server when the information records stored at the messaging server are older than a defined time duration.

12. The apparatus of claim 10, wherein:

the primary wireless device and the secondary wireless device each have cellular service accounts with an identical MNO; and the information records are obtained from the entitlement server by the primary wireless device using a get subscriber identity module (SIM) status query.

13. The apparatus of claim 10, wherein:

the primary wireless device and the secondary wireless device each share a common cellular service account at an MNO; and the information records are obtained from the entitlement server by the primary wireless device using a get SIM status query.

14. The apparatus of claim 10, wherein the information records for management of the cellular service account of the secondary wireless device further include a URL for obtaining emergency service information applicable to the secondary wireless device.

15. The apparatus of claim 10, wherein the account information by which to access the cellular service account of the secondary wireless device includes: i) an international circuit card identifier (ICCID) value or a hashed version thereof for an electronic SIM (eSIM) of the secondary wireless device, and ii) a token for access to the cellular service account of the secondary wireless device.

16. A non-transitory computer-readable medium storing instructions for cellular service management for a secondary wireless device, the instructions comprising:

instructions for obtaining, from an entitlement server, information records for management of a cellular service account of the secondary wireless device; and instructions for storing, at a messaging server accessible to a primary wireless device associated with the secondary wireless device and to the secondary wireless device, the information records for management of the cellular service account of the secondary wireless device, wherein the information records for management of the cellular service account of the secondary wireless device include: i) a management account universal record locator (URL) for a mobile network operator (MNO) account management server at which to manage the cellular service account of the secondary wireless device, and ii) account information by which to access the cellular service account of the secondary wireless device.

17. The non-transitory computer-readable medium of claim 16, further comprising:

instructions for refreshing the information records for management of the cellular service account of the secondary wireless device by obtaining updated information records from the entitlement server and storing the updated information records at the messaging server when the information records stored at the messaging server are older than a defined time duration.

18. The non-transitory computer-readable medium of claim 16, wherein:

the primary wireless device and the secondary wireless device each have distinct cellular service accounts;

cross communication between the distinct cellular service accounts is supported; and the information records are obtained from the entitlement server by the secondary wireless device using a get SIM status query.

19. The non-transitory computer-readable medium of claim 16, wherein the information records for management of the cellular service account of the secondary wireless device further include a URL for obtaining emergency service information applicable to the secondary wireless device.

20. The non-transitory computer-readable medium of claim 16, wherein the account information by which to access the cellular service account of the secondary wireless device includes: i) an international circuit card identifier (ICCID) value or a hashed version thereof for an electronic SIM (eSIM) of the secondary wireless device, and ii) a token for access to the cellular service account of the secondary wireless device.

* * * * *